March 6, 1951 — V. W. HIGGINS — 2,544,316
SEASONING POINT FOR MEATS
Filed March 29, 1948
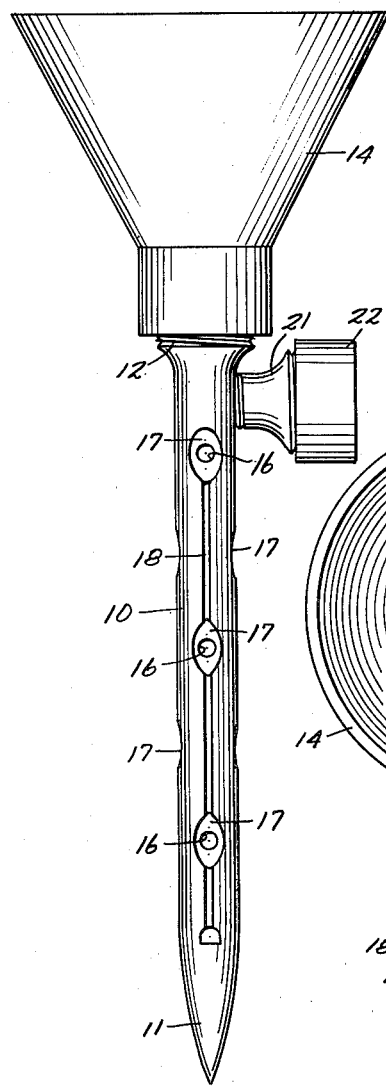
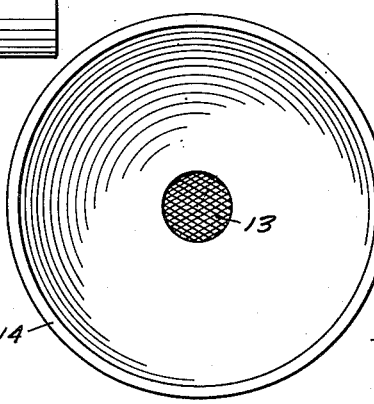
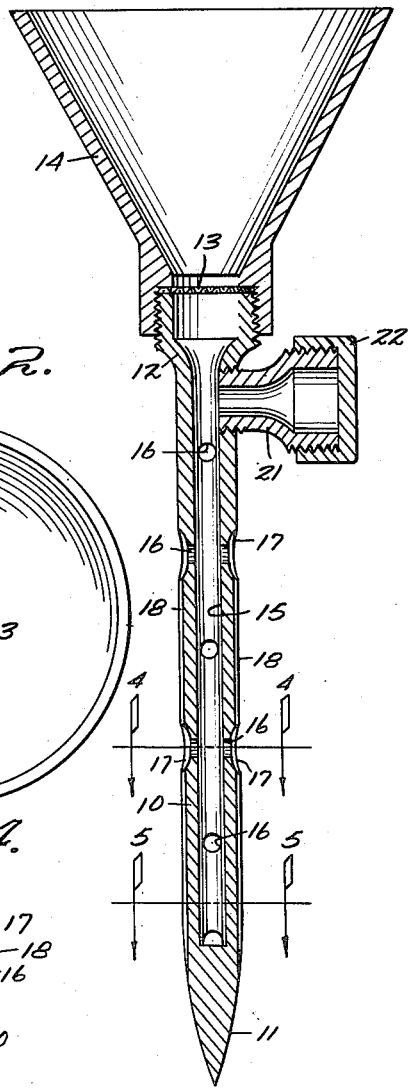
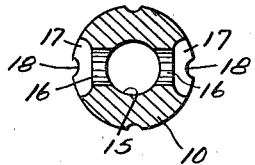
INVENTOR.
Victor W. Higgins,
BY Victor J. Evans & Co.
ATTORNEYS Patented Mar. 6, 1951

2,544,316

UNITED STATES PATENT OFFICE 2,544,316

SEASONING POINT FOR MEATS

Victor W. Higgins, Essex, Conn.

Application March 29, 1948, Serial No. 17,763

1 Claim. (Cl. 99—256)

This invention relates to a seasoning point.

It is an object of the present invention to provide means for carrying liquid seasonings to the interior of roasting meat whereby the meat will be seasoned throughout instead of only on the exterior of the roast when seasoning is effected by the present methods.

Other objects of the present invention are to provide a seasoning point or device which is of simple construction, inexpensive to manufacture, and efficient in operation.

For other objects and for a better understanding of the invention, reference may be had to the following detailed description taken in connection with the accompanying drawing, in which Fig. 1 is a side elevational view of the seasoning point embodying the features of the present invention.

Fig. 2 is a top plan view of the seasoning point.

Fig. 3 is a longitudinal sectional view of the seasoning point.

Figs. 4 and 5 are respectively transverse sectional views taken on lines 4—4 and 5—5 of Fig. 3.

Referring now to the figures, 10 represents a stem having a pointed end 11 and an externally threaded enlargement 12 at the oppositie end of the same. On this enlargement there is placed a screen 13 and a funnel 14 into which seasonings are poured. The stem has a central bore 15 with vertically spaced transverse openings 16 therein extending radially outwardly from the bore. These openings enter recesses 17 on the exterior of the stem which communicate the juices to longitudinally extending grooves 18 on the periphery of the stem. Accordingly, juices poured into the funnel will extend down through the bore 15 and outwardly and finally grooves 18 on the exterior of the stem.

Extending outwardly from the side of the stem is a threaded fitting 21 having a cap 22 thereon. This fitting and cap serve as a handle for inserting the point into the meat and if desired seasoning liquids can be poured into the fitting as when the point is extended into the meat from the side.

While various changes may be made in the detail construction, it shall be understood that such changes shall be within the spirit and scope of the present invention as defined by the appended claim.

I claim:

A seasoning point comprising a stem, an enlarged externally threaded portion on the upper end of said stem, a screen on the outer edge of said portion a funnel threadedly attached to the portion on the upper end of the stem, and said funnel adapted to retain said screen in position on the outer edge of said portion the opposite end of the stem being pointed so that the same can be easily extended into the meat, a central bore within the stem communicating with the funnel and for receiving the seasoning liquid, said stem having radially outwardly extending openings at different elevations thereon through which fluid may pass outwardly, said stem having peripheral grooves extending from the openings so that liquid will pass from the outer portions of the openings downwardly along the stem, said stems having recesses about the openings and said grooves extending vertically and connecting with the recesses vertically aligned with one another and a radially extending fitting removably connected with said stem below and adjacent to said threaded portion and having communication with the bore in said stem and a cap removably secured to said fitting, said fitting serving to receive seasoning liquid when the stem is in a substantially horizontal position within the meat and to serve as a handle portion for inserting the point into the meat.

VICTOR W. HIGGINS.

REFERENCES CITED

The following references are of record in the file of this patent:

UNITED STATES PATENTS

| Number | Name | Date |
|---|---|---|
| 341,357 | Sterling | May 4, 1886 |
| 1,425,143 | Schieb | Aug. 8, 1922 |
| 1,737,069 | Barber | Nov. 26, 1929 |
| 1,947,687 | Weast | Feb. 20, 1934 |

FOREIGN PATENTS

| Number | Country | Date |
|---|---|---|
| 177,568 | Switzerland | Aug. 1, 1934 |